M. G. CROOKS.
LIQUID LEVEL REGISTER AND ALARM.
APPLICATION FILED MAR. 20, 1914.
1,129,051.   Patented Feb. 16, 1915.
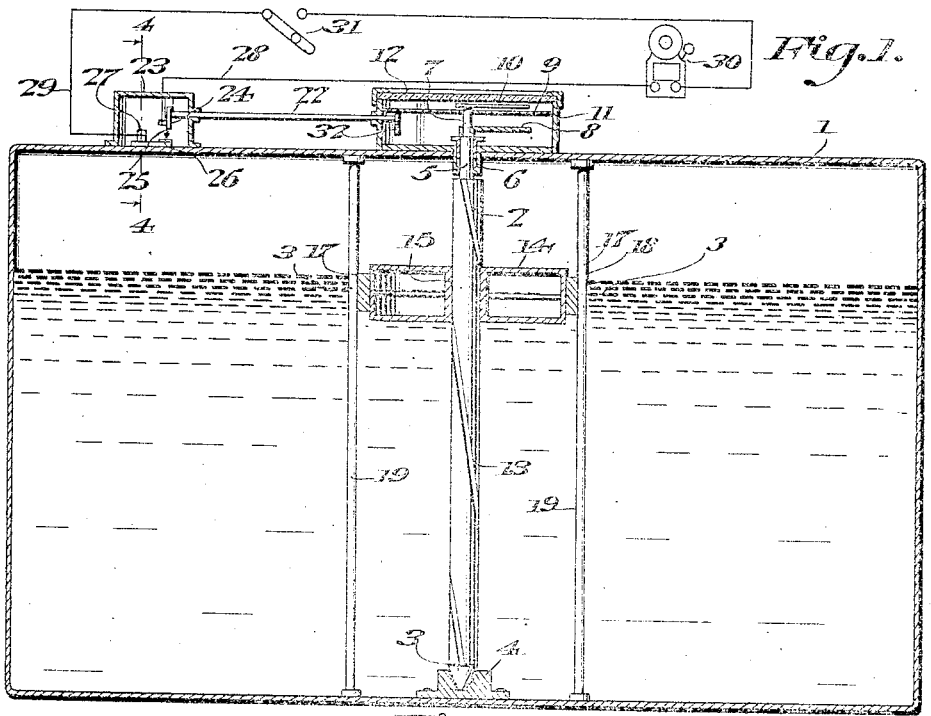
Fig. 1.
Fig. 2.
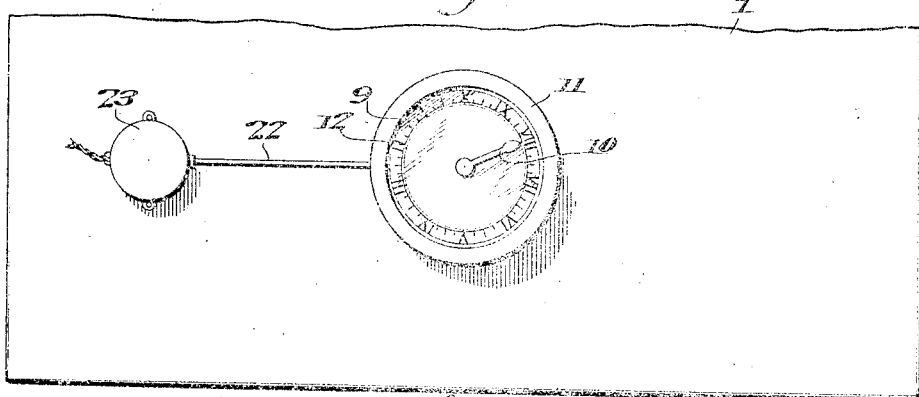
Fig. 3.
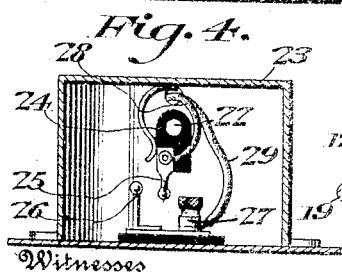
Fig. 4.
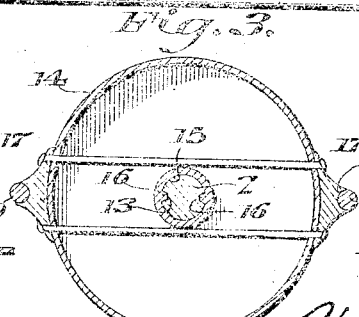
Fig. 5.
Inventor
Myter G. Crooks
By Victor J. Evans
Attorney
Witnesses

UNITED STATES PATENT OFFICE.

MYLER GLEN CROOKS, OF EVANSVILLE, INDIANA.

LIQUID-LEVEL REGISTER AND ALARM.

1,129,051.

Specification of Letters Patent. Patented Feb. 16, 1915.

Application filed March 20, 1914. Serial No. 826,064.

*To all whom it may concern:*

Be it known that I, MYLER G. CROOKS, a citizen of the United States, residing at Evansville, in the county of Vanderburg and State of Indiana, have invented new and useful Improvements in Liquid-Level Registers and Alarms, of which the following is a specification.

This invention relates to a liquid level register and alarm for tanks, reservoirs and like receptacles, the object in view being to produce simple and reliable means for automatically indicating or registering the level of liquid in such tank or reservoir, at all times, and also audibly indicating the fact that the liquid level has reached a predetermined point, the invention being particularly designed for use on motor vehicles to indicate how many gallons of gasolene or other liquid fuel, or lubricating oil, remain in the tank.

A further object of the invention is to provide means adapting the mechanism to sound an alarm at any point which may be found desirable so that it may be set to sound the alarm at any desired point in the liquid level.

A further object of the invention is to provide means whereby the alarm mechanism may be cut out.

A further object is to provide a construction of the character above referred to which may be easily adapted to tanks of different capacities.

With the above and other objects in view, the invention consists in the novel construction, combination and arrangement of parts as will be hereinafter more fully described, illustrated and claimed.

In the accompanying drawings:—Figure 1 is a vertical section through a tank or reservoir equipped with the present invention. Fig. 2 is a plan view of the same. Fig. 3 is a horizontal section on the line 3—3 of Fig. 1. Fig. 4 is a vertical section on the line 4—4 of Fig. 1. Fig. 5 is a detail view of the arm on the revoluble shaft.

Referring to the drawings 1 designates a tank or reservoir of any capacity and adapted to contain liquid of any kind. Arranged at any convenient point in the tank 1 is a revoluble vertical shaft 2 the lower end of which is preferably conical or pointed as shown at 3 and supported in and by a bottom step 4 formed with a bearing for the lower extremity of the shaft 2, said step being fastened to the bottom wall of the tank.

Near its upper end the shaft 2 is reduced as shown at 5 where it fits into and passes through a stuffing box 6. Above the stuffing box said shaft is further reduced as at 7 and has adjustably fastened thereon an arm 8 located below a registering dial 9, and another arm or pointer 10 located above said dial. The arm 8 is adapted to actuate the switch of the alarm mechanism hereinafter described, while the pointer or indicator 10 is adapted to move around the graduated face of the dial 9 which face is graduated to indicate the number of gallons in the tank.

The dial 9 is shown as mounted in an inclosing case 11 with a glass cover or panel 12 to exclude foreign matter and enable the registering mechanism to be observed at any time.

The shaft 2 is threaded as shown at 13, two of such threads being shown in the form of grooves and each thread extending only once around the shaft from end to end thereof. The shaft is turned by means of a buoyant runner 14 preferably consisting of a block of cork suitably treated and protected with a coating of shellac or cement, the position of said runner being governed by the level of the liquid in the tank. The runner is provided with a vertical opening 15 extending therethrough for the shaft 2 and said runner is provided with fingers 16 which travel in the grooves 13 of the shaft.

To prevent the runner 14 from turning, it is provided at opposite sides thereof with shoes 17 which are grooved at 18 to embrace parallel guide rods 19 at opposite sides of the shaft 2 and the runner 14. The brackets 17 are preferably fastened to the runner 14 by means of bolts 21 extending through the runner and holding both brackets.

The alarm mechanism comprises a rock shaft 22 which is shown extending horizontally above the tank 1 and journaled in one side of the dial case 11 and also journaled in one side of an electric switch case 23. Within the switch case, the shaft 22 is provided with an arm 24 of insulating material such as fiber said arm carrying a flexible contact point or plate 25 which is adapted to be thrown into contact with another stationary flexible contact point or plate 26, the said plates 25 and 26 having associated therewith binding posts 27 to which are attached the wires 28 and 29 of an electric circuit including an alarm bell 30 which may be placed on the dash of the vehicle or any other suitable supporting element of the machine. An additional switch 31 is provided so that the operator may throw the bell out of circuit after the alarm has been sounded, in order to keep the alarm from ringing continuously.

At its other end the shaft 22 is provided with an arm 32 which lies within the case 11 and in the path of the arm 8 on the shaft 2. The arm 8 is in the form of a sector as shown in Fig. 5 and as the shaft 2 revolves, said arm 8 comes in contact with the arm 32 and lifts the last named arm, holding it elevated by reason of the broad surface of the arm 8. The movement referred to rocks the shaft 22 and closes the alarm circuit by bringing the contact points or plates 25 and 26 together.

The arm 8 may be set to trip the rock shaft 22 and sound the alarm when one, two, three or more gallons of liquid remain in the tank so that the alarm may be sounded at any selected or predetermined point. As the level of the liquid falls, the buoyant runner descends and in so doing it turns the shaft 2 thereby causing the pointer or indicator to move around the face of the dial. The operator may therefore at a glance ascertain how many gallons are contained in the tank. When the predetermined level is reached, the alarm is automatically sounded by the mechanism described. Thus the whole system is automatic in operation. The mechanism may be adapted to tanks of different capacities by merely substituting a shaft 2 and guides 19 of the proper length. The mechanism may be installed in any tank by removing sections of the top and bottom walls of the tank.

What I claim is:—

A liquid level alarm for tanks and the like, comprising a revoluble shaft, a non-revoluble buoyant runner engaging said shaft and adapted as it rises and falls with the liquid level to turn said shaft, an arm on said shaft, an alarm circuit, means actuated by said arm to close said circuit, said means including an electric switch, and a rock shaft carrying one pole of the switch and also having an arm in the path of the shaft arm.

In testimony whereof I affix my signature in presence of two witnesses.

MYLER GLEN CROOKS.

Witnesses:
    JOSEPH SCHMALZBAUER,
    ERNEST SWIFT.